July 24, 1923.
J. S. ALSPAUGH
GEAR SHIFT MECHANISM
Filed July 5, 1922
1,462,530
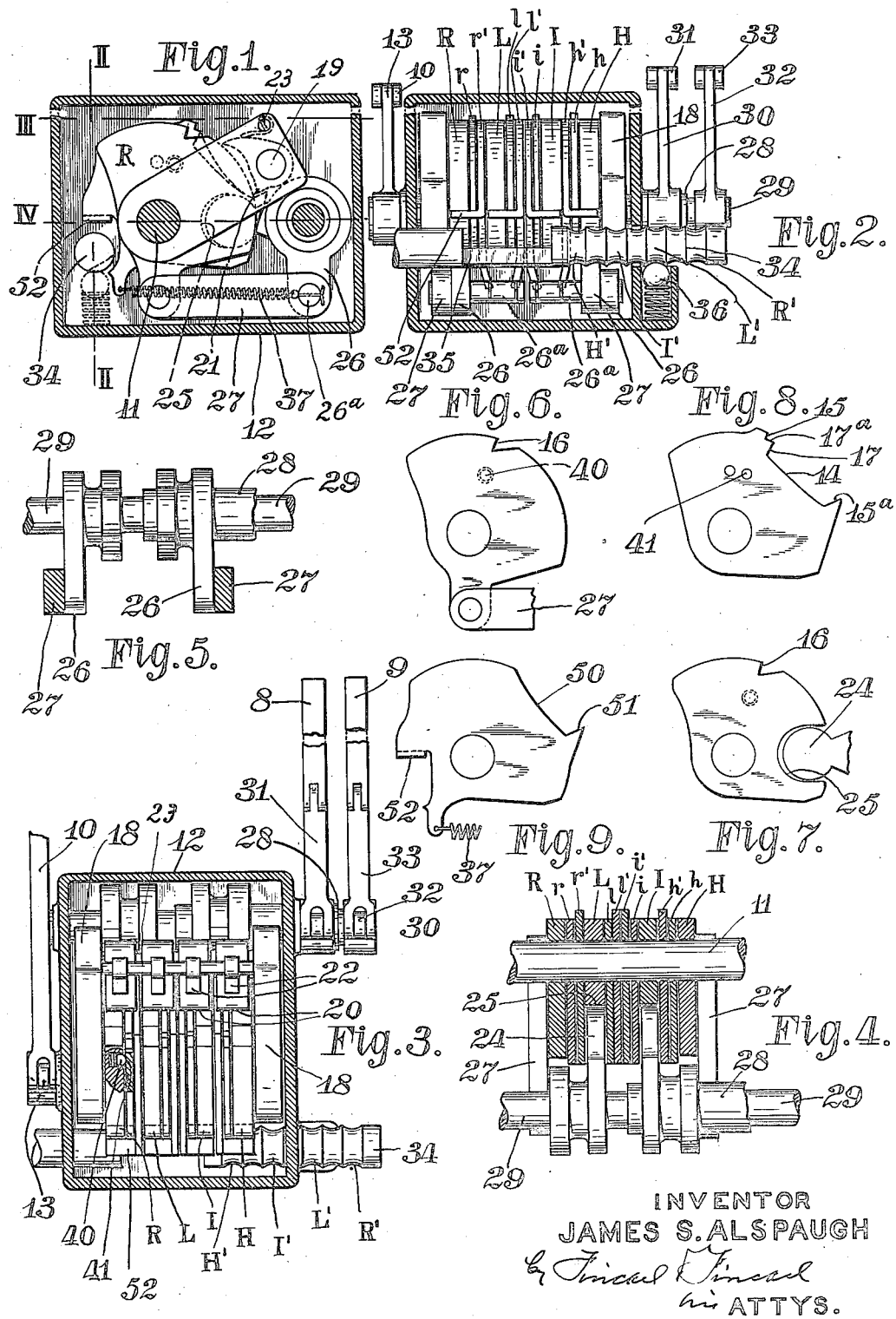
INVENTOR
JAMES S. ALSPAUGH
by Fincel & Fincel
his ATTYS.

Patented July 24, 1923.

1,462,530

UNITED STATES PATENT OFFICE.

JAMES S. ALSPAUGH, OF PORTSMOUTH, OHIO.

GEAR-SHIFT MECHANISM.

Application filed July 5, 1922. Serial No. 572,994.

*To all whom it may concern:*

Be it known that I, JAMES S. ALSPAUGH, a citizen of the United States, residing at Portsmouth, in the county of Scioto and State of Ohio, have invented a certain new and useful Improvement in Gear-Shift Mechanisms, of which the following is a specification.

The present invention relates more particularly to a gear shift mechanism for a motor vehicle, such mechanism being of the sliding type such as used, for example, in the "Cadillac" and many other cars. In this sort of mechanism, as well understood, a hand lever is commonly used to shift the gears into low, intermediate, high and reverse, such mechanism including two rods, one of which is shifted to obtain low and reverse, and the other shifted to obtain intermediate and high. In United States patents issued to me January 31, 1922, No. 1,402,334, and May 29, 1923, No. 1,456,496 I show and describe a mechanism for dispensing with the use of a hand operated lever. I also show a refinement of such a mechanism in an application for patent filed by me December 22, 1921, S. No. 524,117. The present invention, as in my former constructions, is designed to be operated by the ordinary clutch lever and its associated spring or an equivalent therefor in conjunction with a selector device that may be manually operated, if desired, at the steering wheel. The principal object of the present invention is to provide a mechanism that is compact vertically and can be applied to gear shift rods and clutch levers without extensive modification of either. Other objects and features of the invention will appear from the disclosure herein.

In the accompanying drawings illustrating one example of the invention—

Figure 1 is a view in elevation looking at the left hand end of the mechanism, the housing being in section.

Fig. 2 is an elevation of the forward side of the mechanism, the housing being in section on the line II—II Fig. 1.

Fig. 3 is a top plan view, partly in section, of the mechanism, the housing being in section on the line III, Fig. 1.

Fig. 4 is a detail in horizontal section on the line IV Fig. 1, looking down and showing the bell crank levers and links that are actuated by the levers.

Fig. 5 is a detail partly in vertical section showing the bell crank levers and links (in section) and the shaft on which the bell cranks are mounted.

Fig. 6 is a side view of the link-carrying gear shift rod operating lever.

Fig. 7 is a similar view of its companion gear shifting lever, said lever directly engaging an arm of the bell crank lever.

Fig. 8 is a side view of one of the bridging plates, they being in a set of four all alike.

Fig. 9 is a side view of one of a set of four selector plates, they being all substantially alike.

In the several views 9 designates the low and reverse gear shifting rod while 8 designates the second and high gear shifting rod. These rods are those commonly present in gear shifting mechanism of the kind particularly referred to, said rods being modified in the present invention only for connection with their operating means as herein set forth. In the present construction these rods 9 and 8 are operated by a forward stroke of the usual clutch lever, a rod 10 being connected with the foot pedal arm of that lever at the proper point for that purpose.

11 designates a shaft journaled in a suitable housing 12 to which shaft the rod 10 is connected by a crank arm 13 so that upon pushing the clutch lever out with the foot said shaft 11 is rocked in the forward direction and upon releasing said lever of pressure said shaft is rocked in a rearward direction due to the action of the usual clutch spring (not shown) for engaging the clutch.

The shaft 11 has loose upon it two pairs of thick sector-like gear shifting levers suggestively designated R, and L, and I and H. Each of said levers has a companion thin sector-like plate designated $r$, $l$, $i$ and $h$, respectively. These thin plates may be termed "bridging" members. Each of said thick levers also in the present instance has a companion thin sector-like plate designated $r'$, $l'$, $i'$ and $h'$ respectively. These last named plates may be termed "selector" members. A face of each thick lever or plate is provided with a spring actuated latching ball 40 to engage either of two shallow sockets 41, one being preferably elongated, in the companion bridging plate to yieldingly hold the bridging plate in the position to which shifted in relation to the thick lever and prevent it from shaking out of operative position. The gear shift rod operating levers R, L, I and H are each made with a short notch to form a tooth 16. Each of the bridging plates is made with a cut away portion 14, a projecting forward tooth 15 providing a seat 17ª, a forward tooth 17 and a rear tooth 15ª. The selector plates are each provided with a cut away portion 50, a rear tooth 51 and at its front edge with a laterally projecting finger 52 of nearly a length equal to the thickness of a rod operating lever and its two companions, the bridging and selector plates. The two selector plates of the companion thick levers are provided with springs 37 connected to lateral pins 26ª on arms 26, said springs tending to pull the upper portions of the plates forward and their fingers 52 downward. In the neutral position of the two gear shift rods 9 and 8 the teeth 16 of all the levers R, L, I and H, stand in the same horizontal line as indicated in Figs. 1 and 3.

Secured to the shaft 11 at opposite sides of the whole group of levers and plates are the end members 18 of a frame for carrying pawls for actuating the respective levers, said frame members having secured between them a shaft 19 on which said pawls are pivoted. The said pawls are each formed with a beak 20 of such width as to engage the teeth 16, 17 and 17ª referred to and a tail 21 to engage the teeth 15ª and 51 of companion plates for the purpose hereinafter explained. The beak of the pawls are each held normally toward the rim of the thick lever it actuates by means of spring 22 secured to a small rod 23 extended between the upper corners of the frame members 18.

The members of each of the two pairs of the thick or gear shift rod operating levers are connected for reciprocal operation in contrary directions, that is to say when one lever of a pair is rocked forward the other is rocked rearward by means of a bell crank lever having one arm 24 reaching into a radial slot 25 in one of the levers and its arm 26 connected by means of a link 27 with the companion lever. The bell crank lever of the R and L levers is secured to a solid rock shaft 29 while the bell crank lever of the I and H levers is secured on a hollow rock shaft 28 telescoped on the solid shaft 29, both shafts being journaled in the housing 12. A crank arm 30 secured to the hollow shaft 28 is connected by means of a link 31 with the intermediate and high gear shift rod 8 while a crank arm 32 secured to the solid shaft 29 is connected by means of link 33 with the low and reverse gear shift rod 9.

34 designates the selector bar or gate. This bar 34 is arranged to slide in the housing 12 in the path of movement of the horizontal fingers 52 of the selector plates, said bar, however, being provided with a notch 35 adapted to permit the movement downward of either one or two of said fingers 52, according to whether the operation is selective or automatic, into the notch under the action of the springs 37 when the tail 21 of the pawl is raised thereby uncovering the notch forming the tooth 16 of the thick lever so that the pawl may carry said thick lever forward beyond the neutral position according to the selected position of the notch 35. Contact of the finger 52 with the upper or unnotched side of the bar 34 is designed to prevent the beak of the pawl from engaging the tooth of the companion thick lever and leave such companion thick lever at neutral position. Said selector bar 34 is provided at one end with a series of four annular grooves suggestively designated R', L', I' and H' and grooves intermediate them each of which is engageable by a spring actuated ball latch 36 to yieldingly hold said bar in the position to which it may be slid. The selector bar can be provided with any suitable means (not shown) within convenient reach of the driver of the vehicle for shifting it back and forth into any of the positions provided by the annular notches. The selector bar can thus be shifted for selective operation to bring its notch 35 into position to permit the operation of any one of the pawls and the gear shifting or thick lever it is to operate when the clutch lever is pushed forward. When the notch 35 is moved to a position where the ball latch 36 engages one of the intermediate annular notches it permits the descent of two fingers 52 but the operation of one only of the shift rod operating or thick levers for the reason to be hereinafter indicated in connection with the description of automatic shifting as herein distinguished from selective shifting.

The selector bar as shown in Figs. 2 and 3 is set for selective actuation of the "low" lever L and its companion bridging member l. Upon pushing forward the clutch rod 10 all the pawls are raised but only the selector l' for actuating the lever L and member l enters notch 35 and therefore only the teeth 16 and 17 of said levers L and l are engaged to rock said members. The rocking of the lever L forward shifts the rod 9 forward to secure low speed. It will be remembered that this operation also rocks the lever R rearward carrying its tooth rearward below neutral position but being loose on the shaft 11 it rocks idly. In this rearward position of the R lever the tooth 16 is exposed and the beak of its operating pawl drops into it. It will also be noted that all the bridging members except the companion of the operated thick lever are moved forward because of the engagement of the pawls with the seat 17ª. All the selector members follow the pawls upon their forward stroke under the action of their springs to the extent permitted by the position of the selector bar. Upon the retraction of the clutch rod 10 after said operation the lever L and the rod are left forward where thus placed but the selective and bridging members are all carried rearward to neutral position by the engagement of the tails 21 of the pawls with projections 15ª and 51. It being remembered that upon the first forward stroke just described the gear rod operating lever R, because connected with the lever L, stands shifted rearward placing its tooth below the neutral position it will be noted that a second forward stroke of the clutch lever with the selector bar set for low only as described will permit the engaged pawl for said R or reverse thick lever to carry R lever to neutral position only. This second stroke also, of course, draws the L lever rearward, leaving it at neutral because its pawl is bridged and becomes disengaged. To go into reverse the selector bar 34 is shifted to the left two notches to permit the member r' to enter notch 35 in the selector bar thereby leaving the beak engaged with the tooth 16 to carry the lever R beyond neutral to forward or shifting position. In this operation the pawl that operates the L lever is held up on the seat 17ª permitting the L lever to return to the rear of neutral position.

Referring now generally to Figs. 6, 7, 8 and 9 and to recapitulate it will be noted that when lever of Fig. 6 is moved forward from neutral the plate of Fig. 9 is permitted to move forward by the opening 35 in the selector bar. When the lever of Fig. 6 has been moved forward its gap is closed by the return of the plate of Fig. 8 upon the release of the clutch lever, the tail of its pawl acting on lug 15ª to accomplish this. The lever of Fig. 6 and plate of Fig. 8 are held together in forward position by the ball latch 40 so that upon rearward movement of the lever of Fig. 6 the plate of Fig. 8 will ride rearward with said lever to neutral position. In selective operation the lever of Fig. 6 is restored to neutral position by the forward movement to neutral position of companion lever Fig. 7. The long gaps on the plates of Figs. 8 and 9 permit the pawl to engage either of the levers of Figs. 6 and 7 when in rear of neutral position. In the selective operation when either of the levers of Figs. 6 and 7 is restored to neutral position as stated by the forward movement of the pawl of the companion lever the pawl is released by sliding up the incline of the selector plate, said plate being held by contact with the top of selector bar.

If the selector bar is set for automatic operation that is so that two of the fingers 52 can descend and one of the rod operating levers being advanced and the pawls retracted the pawl of the companion rod operating lever takes into notch 16 of such companion lever and moves that lever forward and past neutral position because as before premised the selector member of both companions can go into notch 35 of the selector bar. Upon the return of the companion lever of the thus actuated lever and because the notch 16 of such lever is closed by the bridging plate (Fig. 8) and said plate is latched to the lever by the ball latch, said bridging plate moves rearward with the notch 16 of the companion closed, its pawl riding on the arcuate portion of the rim of the lever and entering seat 17ª thereby causing the release of the bridging plate from the lever and permitting the lever to move in the opposite direction with the pawl still engaged with said seat 17ª and precluding the pawl from entering the notch 16 of the companion rod operating lever. When the selector bar is placed for the automatic operation of the middle levers L and I the operation of the said levers L and I is out of neutral and back to neutral alternately upon the operation of the pawls.

The forms of the parts can be changed without departing from the gist of the invention as claimed.

What I claim is:

1. In a motor vehicle having a foot lever and a gear shift rod, means for reciprocating said gear shift rod comprising, in combination, a rock shaft having means for engaging said gear shift rod, a pair of levers connected together and to said rock shaft to cause a back and forth motion of said rock shaft when said levers are alternately and successively moved in the same direction, means operated by the foot lever for imparting such movements to said levers and a selector plate on said rock shaft cooperating with said levers and means for controlling the operation of the selector plate to cause the shifting of said levers from shifted to neutral position by successive operations of the foot lever.

2. In a motor vehicle having a foot lever and a gear shift rod, means for reciprocating said gear shift rod comprising, in combination, a rock shaft having means for engaging said gear shift rod, a pair of levers connected together and to said rock shaft to cause a back and forth motion of said rock shaft when said levers are alternately and successively moved in the same direction, means operated by the foot lever for imparting such movements to said levers and selector and bridging members on said rock shaft cooperating with said levers and means for controlling their actuation to cause the shifting of said levers from shifted to neutral position by successive operations of the foot lever.

3. In a motor vehicle having a foot lever and a gear shift mechanism including two gear shift rods, means for reciprocating said rods comprising, in combination, two rock shafts, one having means for engaging one of said rods and the other having means for engaging the other of said rods, two pairs of levers, the members of each pair being connected together and to the said respective shafts to cause a back and forth motion of its shaft when the levers of the pair are alternately and successively moved in the same direction, means operated by the foot lever for imparting such movements to said levers, and a selector device on said rock shaft and means for controlling the operation of the same to cause the shifting of any one of said levers of either pair from shifted to neutral position by successive operations of the foot lever.

4. In a motor vehicle having a foot lever and a gear shift mechanism including two gear shift rods, means for reciprocating said rods comprising, in combination, two rock shafts, one having means for engaging one of said rods and the other having means for engaging the other of said rods, two pairs of levers, the members of each pair being connected together and to the respective rock shafts to cause a back and forth motion of its shaft when the levers of the pair are alternately and successively moved in the same direction, means operated by the foot lever for imparting such movements to said levers, and a selector device on said rock shaft and means for controlling the operation of the same to cause the shifting of any of said levers at will from neutral to gear shifting position and the shifting of any one of said levers of either pair from shifted to neutral position by successive operations of the foot lever.

5. In a motor vehicle having a foot lever and gear shift mechanism, including two gear shift rods, means for reciprocating said rods comprising, in combination, two rock shafts, one having means for engaging one of said rods and the other having means for engaging the other of said rods, two pairs of toothed levers the members of each pair being connected together and to the respective rock shafts to cause a back and forth motion of its shaft when the levers of a pair are alternately and successively moved, a rocking frame carrying a pawl for engaging the tooth of each of said levers, means connecting said frame with the foot lever for actuation thereby and a selector device on said rock shaft and means for controlling the operation of the same adapted to permit the actuating for gear shifting by the pawl of one only of said levers upon the operation of the foot lever.

6. In a motor vehicle having a foot lever and a gear shift mechanism including two gear shift rods, means for reciprocating said rods comprising, in combination two rock shafts, one having means for engaging one of said rods and the other having means for engaging the other of said rods, two pairs of toothed levers, the members of each pair being connected together and to the respective rock shafts to cause a back and forth motion of its shaft when the levers of the pair are alternately and successively moved, a rocking frame carrying a pawl for engaging the tooth of each of said levers, means connecting said frame with the foot lever for actuation thereby, a selector device on said rock shaft and means for controlling the same adapted to permit the actuation for gear shifting by the pawl of one only of said levers upon the operation of the foot lever, said selector device also adapted to cause the restoration of a previously shifted lever to neutral position by a partial actuation of another of said pawls.

7. In a motor vehicle having a foot lever and a gear shift mechanism including two gear shift rods, means for reciprocating said rods comprising, in combination two rock shafts, one having means for engaging one of said rods and the other having means for engaging the other of said rods, two pairs of toothed levers, the members of each pair being connected together and to the respective rock shafts to cause a back and forth motion of its shaft when the levers of the pair are alternately and successively moved, a rocking frame carrying a pawl for engaging the tooth of each of said levers, means connecting said frame with the foot lever for actuation thereby, bridging means associated with each lever for preventing the successive actuation of any one lever by successive actuation of the foot lever, a selector device on said rock shaft and means for controlling the operation of the same adapted to permit full movement of two of said pawls for gear shifting actuation of first one and then the other of companion levers.

8. Means for reciprocating a gear shift rod comprising, in combination, a rock shaft and means for actuating said rod from said shaft, a pair of levers connected together and to said rock shaft to cause a back and forth motion of the shaft when said levers are successively moved in the same direction and means for actuating either of said levers at will, means on the rock shaft for preventing the successive actuation of the same lever, a selector bar for controlling said means and means whereby said levers are caused to move out of and into a neutral position by successive actuations of said levers.

9. In means for actuating a gear shift rod, the combination of a rock shaft, means in connection therewith for moving the gear shift rod, a pair of levers, a bell crank member secured to said rock shaft and having one of its arms operably engaged with one of said levers and its other arm linked to the other of said levers to cause a retrograde movement from a neutral position of the other lever when either of said levers is advanced from such a position, means whereby either of said levers may be advanced at will and means consisting of two plates companion to each of said levers and means for controlling their operation to cause the restoration of either of said levers to said neutral position upon a second operation of the said advancing means.

JAMES S. ALSPAUGH.